United States Patent [19]

Nyffeler et al.

[11] Patent Number: 4,530,521
[45] Date of Patent: Jul. 23, 1985

[54] ELECTRICALLY WELDABLE SOCKET FOR JOINING PIPE MEMBERS

[75] Inventors: Heinz Nyffeler, Recherswil; Guido Banholzer, Obergerlafingen, both of Switzerland

[73] Assignee: Von Roll AG, Gerlafinger, Switzerland

[21] Appl. No.: 592,112

[22] Filed: Mar. 22, 1984

Related U.S. Application Data

[63] Continuation of Ser. No. 238,449, Feb. 26, 1981, abandoned.

[30] Foreign Application Priority Data

Mar. 4, 1980 [CH] Switzerland ......................... 1706/80

[51] Int. Cl.³ ............................................. F16L 47/02
[52] U.S. Cl. ...................................... 285/21; 219/544; 285/381
[58] Field of Search ................... 285/21, 22, 423, 381; 219/544

[56] References Cited

U.S. PATENT DOCUMENTS

| | | | |
|---|---|---|---|
| 3,190,771 | 6/1965 | McLean et al. | 219/544 X |
| 3,393,292 | 7/1968 | Ritscher | 219/544 X |
| 3,943,334 | 3/1976 | Sturm | 285/21 X |
| 4,037,083 | 7/1977 | Leavines | 219/544 X |
| 4,117,311 | 9/1978 | Sturm | 219/544 |
| 4,176,274 | 11/1979 | Lippera | 219/544 X |
| 4,313,053 | 1/1982 | Sturm | 285/21 X |

Primary Examiner—Thomas F. Callaghan
Attorney, Agent, or Firm—Murray Schaffer

[57] ABSTRACT

A socket for joining the ends of conduits, pipe or the like comprising a body of thermoplastic material in which is embedded, in a helical coil, a resistance wire strand formed of a plurality of juxtaposed individual thin wire elements, the wire elements being in part spaced from one another, to form gaps allowing for expansion of or movement of the wire elements without overall expansion or movement of the strand.

7 Claims, 5 Drawing Figures

ELECTRICALLY WELDABLE SOCKET FOR JOINING PIPE MEMBERS

RELATED APPLICATION

The present application is a continuation of Ser. No. 238,449, filed Feb. 26, 1981 and now abandoned.

BACKGROUND OF THE INVENTION

The present invention relates to an electrically weldable socket, sleeve or bushing for joining pipe members, and in particular to such a member made from thermoplastic material having a resistance heating wire embedded therein close to its inner wall in the form of spaced turns or helix, the member is partly softened together with the piece to which it is connected by the heat produced by the resistance heating wire and is welded with the latter.

Pipe systems are now frequently produced by using thermoplastic pipe members. Pipe members are understood to mean pipe lengths, shaped articles, control members, e.g. valves and other means. The problem arises of assembling the pipe members and interconnecting them in a drip- or leak-proof, pressure-tight and tension-resistant manner at their connection.

Cylindrical sockets with sleeve-like socket bodies made from thermoplastic material, which are welded together with the pipe member connecting pieces are known. The socket member can form part of a pipe member or can be a separate part. For the purpose of partially melting and welding the adjacent surfaces of the parts to be connected, an electrical resistance heating wire is embedded in the vicinity of the inner wall of the socket body in the form of a helix. Through the supply of electric power to this wire, a metered quantity of heat is produced which is sufficient for joining the socket member and the connecting piece. For the purpose of metering this quantity of heat welding units are used. Different constructions of such units are known, so that e.g. on setting a constant voltage or current a specific welding time is obtained.

The socket weldable by means of such welding units would appear to be a relatively simple member. However, it must be ensured that on embedding the heating wire, the individual turns are separated from one another by a sufficiently large amount of plastic, so that interturn short-circuits are reliably prevented. To ensure a good connection of the parts to be welded together, the socket body is given a shrinkage reserve, which is eliminated during the welding process and as a result the socket body engages tightly with the parts to be joined. Whereas during welding the socket body decreases in size, the resistance heating wire, which is heated during the supply of electric power, expands counter to the shrinkage movement of the socket body.

These two oppositely directed movements can bring about a bending of individual turns of the heating wire and can consequently cause a short-circuit, leading to the thermoplastic material of the socket body being damaged or catching fire. The resulting linear expansion of the resistance heating wire also results in the movement of the individual turns away from the welding area and their spacing can become so large that the complete melting of the inner wall within the welding zone may not be possible. Such phenomena are more particularly observed with electrically weldable sockets with a large socket diameter, e.g. over 200 mm.

Different measures have been proposed for obviating these problems. Thus, e.g. the total length of the heating wire can be reduced by using a plurality of individual short helices. This reduces the overall length and expansion of the heating wire, as well as the risk of interturn short-circuits. However, the circuitry expenditure is increased.

It is also known to use a varnish or tape-insulated heating wire, whose insulation is intended to prevent a short-circuit of the interturn type. However, the insulation of commercially available resistance heating wires is such that it is not adequate for effectively preventing interturn short-circuits. There is also a danger that the insulation carbonizing at the higher temperatures of the resistance heating wire, will thereby give off solvent vapours which can cause cavities to form in the welding area.

In order to eliminate the difficulties which more particularly occur when welding large pipe diameters, it has been proposed (in German publication DOS 2,854,618) to leave a sufficient gap between the socket body and the connecting pieces of the pipe members to be connected to receive a welding sleeve and a ring around which is wound the resistance heating wire. Through producing heat in the heating ring, the ring having a shrinkage reserve is deformed in such a way that the welding sleeve presses against the surfaces of the socket and the connecting piece to be joined, followed by softening and welding. However, this connection is time consuming and costly and requires a relatively large amount of space.

In U.S. patent application Ser. No. 129,993, filed Mar. 13, 1980, now abandoned, in which one of the present inventors is also a co-inventor, it was proposed to use a single mono-filament resistance wire having a low coefficient of thermal expansion permitting the thermoplastic material to melt and weld prior to the expansion thereof.

It is the object of the present invention to so develop an electrically weldable socket of the aforementioned type so that a completely satisfactory trouble-free welded joint is reliably contained, even in the case of large pipe diameters, whilst only involving a limited manufacturing expenditure.

These objects and others together with numerous advantages are obtained by the present invention as set forth in the following disclosure thereof.

SUMMARY OF THE INVENTION

According to the present invention an electrically weldable socket is formed of a cylindrical body of thermoplastic material and a helically wound resistance wire comprising a plurality of individual thin wire elements, embedded therein. The helix extends along the length of the sleeve, coaxial with the central axis and in proximity to the inner surface of the body.

The body may be made of two parts, with the wire set in a helical groove. The wire elements may be laid parallel, braided or stranded together.

Full details of the present invention are set forth in the following description and are illustrated in the accompanying drawing.

DETAILED DESCRIPTION OF THE PREFERRED EMBODIMENT

Figure 1:
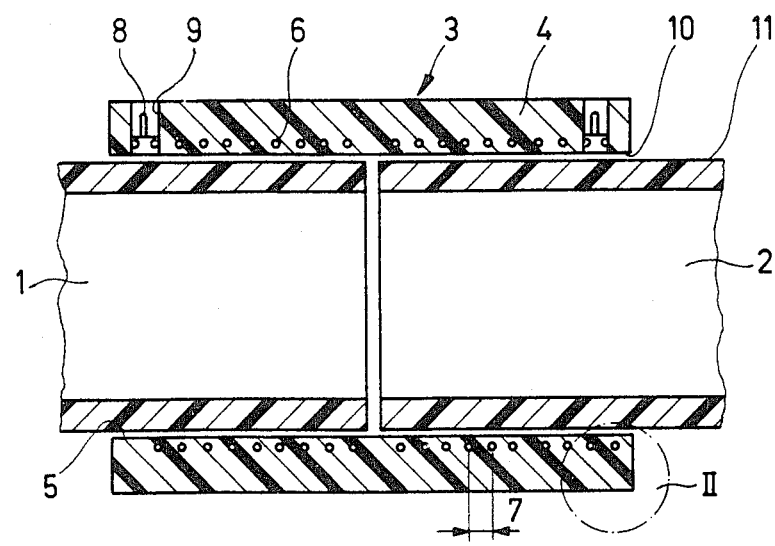
FIG. 1 is a longitudinal sectional view through a diagrammatically represented electrically weldable socket joining two pieces of pipe members.

As seen in FIG. 1, the ends of two pipe pieces 1, 2 are placed within a socket 3. All three of these members are made from thermoplastic material. The socket 3 has a sleeve-like unitary solid socket body 4 having, in the vicinity of its inner wall 5, embedded a resistance heating wire 6 in the form of a helical coil 7. The ends of the resistance heating wire 6 are connected to contacts 8 embedded in a bore 9 located at the ends of the socket body 4. The terminals of a not shown welding unit are connected to contacts 8 and as a result the resistance heating wire 6 is supplied with metered electrical power, sufficient to melt the thermoplastic material and effect welding.

FIG. 1 shows the pipe connecting pieces 1, 2 and socket 3 prior to welding. During welding the supply of electrical power produces heat in the resistance heating wire 6 and there is a partial softening of socket body 4 and connecting pieces 1, 2 until these parts are welded together. During the production of socket 3, the socket body 4 is given a shrinkage reserve, e.g., by mechanical expanding during heating and cooling. The reserve is released on heating socket body 4 and leads to the shrinkage thereof. As a result, the gap 10 present prior to welding between inner wall 5 of socket body 4 and outer wall 11 of connecting pieces 1, 2 is removed. As can be gathered from FIG. 1, the turns of the resistance heating wire 6 need not be distributed evenly over the entire inner wall of the socket body. Thus, the spacing between the turns can increase, particularly in the vicinity of the connecting piece ends.

Figure 2:
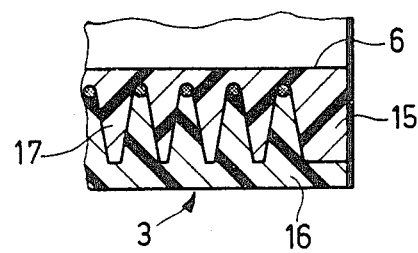
FIG. 2 is a larger-scale view of the cutout II portion of FIG. 1, showing an electrically weldable socket formed of a two-part socket body.

The socket as partly shown in FIG. 2, unlike the socket body 4 of FIG. 1, comprises an inner part 15 and an outer part 16. On the outside surface of inner part 15, there is formed a helical web 17 within the continuous groove of which is placed the resistance heating wire 6. After fitting the latter, the outer part 16 is applied to the inner part 15, so that a compact socket body is obtained.

Figure 5:
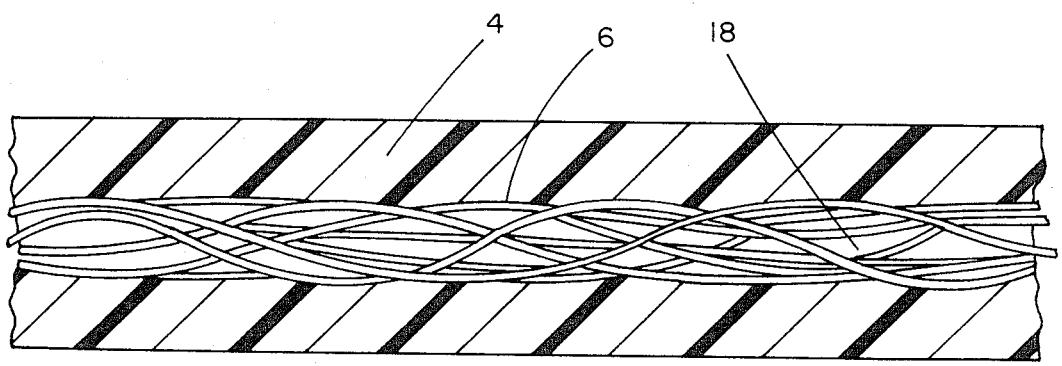
FIG. 5 is a view several times enlarged of a resistance wire, such as shown in FIGS. 3 or 4.

In order to obviate the difficulties found in the aforementioned prior art, when welding sockets, particularly large diameter sockets, the present invention provides that the thermal expansion resulting from the heating of wire 6 be absorbed by the wire itself. To accomplish this, the wire 6 is formed from a plurality of thin individual wires 18. Between the individual wires 18, there are small gaps into which they can move when heating takes place. A random number of individual wires 18 can be used, e.g., 2 to 10 and even more such wires as desired. (See FIG. 5).

For example: In place of a monofilament resistance heating wire of 0.9 mm, a bundled resistance heating wire formed from 13 individual wires was used. The bundle has a diameter of approximately 1.0 mm and the same electrical characteristics as the single wire strands.

Figure 4:
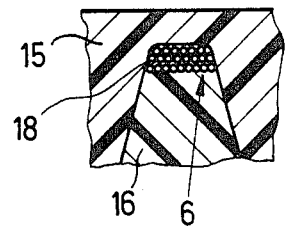
FIG. 4 is a view similar to FIG. 3 showing a further embodiment of the resistance heating wire.
Figure 3:
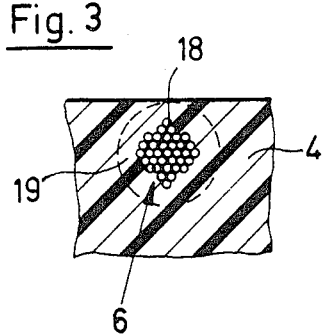
FIG. 3 is an enlarged view showing the resistance heating wire of the present invention embedded in a solid unitary body.

The wire diameter of the individual wire can be approximately 0.01 to 0.02 mm. However, the shape of the bundled resistance heating wire 6, formed from individual wires 18, can be adapted to special requirements and, e.g., as shown in FIG. 4, can have a flat, rectangular cross-section if desired. The individual wires 18 can be bundled in different ways, e.g., they can be entwined or stranded together whereby the spacings or gaps between the filaments are inherently randomly made along its length; i.e. juxtapoxed in diametric cross-section. So that the spacing 7 between the turns of the bundled resistance heating wires 6 is adhered to, it is possible to provide the bundled wire covered with the same or a similar plastic material to the socket body 4, as indicated in FIG. 3 by the dotted line round wire 6.

The resistance heating wire 6, bundled from the individual wires 18, makes it possible to produce a socket 3 in exactly the same way as when using a single monofilament as the resistance heating wire 6. Thus, such sockets can be produced automatically in the same easy manner, but with the advantage that the aforementioned difficulties occurring due to the thermal expansion of the resistance heating wire can be completely avoided. The resistance heating wire formed from individual wire strands 18 can also be used sockets for pipe diameters of 500 to 1800 mm and higher.

It can be advantageous in the case of very large diameters to use individual wire strands made from a material having a lower coefficient of thermal expansion than the plastic and these can also be used for smaller pipe diameter sockets.

Various modifications and embodiments have been disclosed, others will be apparent to those skilled in this art. Accordingly, the present disclosure should be taken as illustrative and not limiting of the present invention.

What we claim:

1. An electrically weldable socket for connecting conduit elements comprising a cylindrical body formed of thermoplastic material capable of shrinking on being heated, and a helically coiled resistance wire, said wire comprising a plurality of individual thin wire strand elements, said wire strand elements being arranged in said wire to provide gaps between the wire strand elements, said wire being embedded in the wall of said body and extending along the length thereof coaxial with the central axis in proximity to the inner surface of the wall of said body, and having terminal ends extending outward of said body for contact with a source of current, said wire strand elements when heated expanding relative to each other into the gaps therebetween without overall radial or axial enlargement of said helically coiled wire.

2. The socket according to claim 1, wherein said cylindrical body is formed of two concentric parts, the inner part having a thread surface into which said wire is laid, and the outer part matingly conforming thereto.

3. The socket according to claim 1 wherein the individual wire strand elements are braided together.

4. The socket according to claim 1 wherein the individual wire strand elements are stranded together.

5. The socket according to claim 1 wherein the individual wires are made from strand material having a low coefficient of thermal expansion.

6. The socket according to claim 1 wherein the resistance heating wire is provided with a plastic covering.

7. The socket according to claim 1 wherein the cross-section of the resistance heating wire formed by the individual wire strand elements has a flat rectangular shape.

* * * * *